Dec. 10, 1968  P. C. TREXLER  3,415,582
TETRAHEDRON ISOLATOR AND METHODS OF MAKING THE SAME
Filed Dec. 20, 1965
2 Sheets-Sheet 1
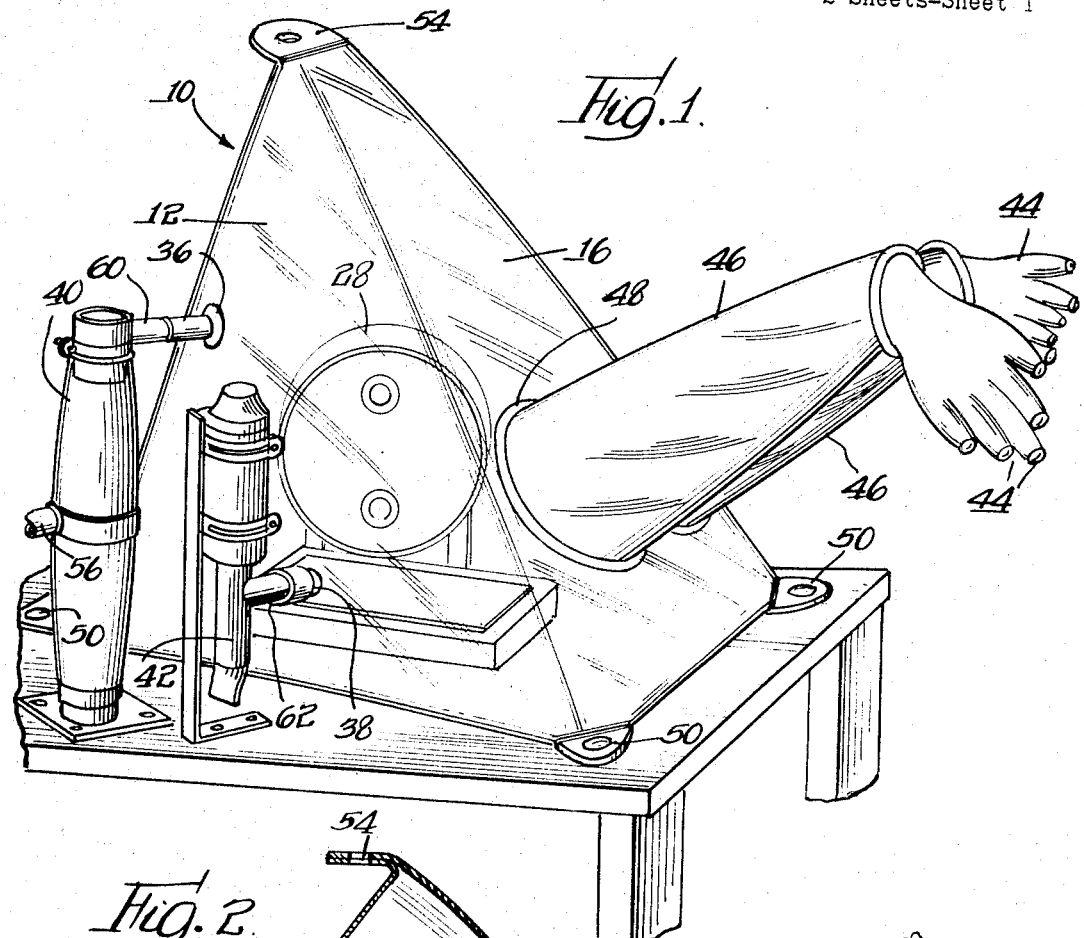
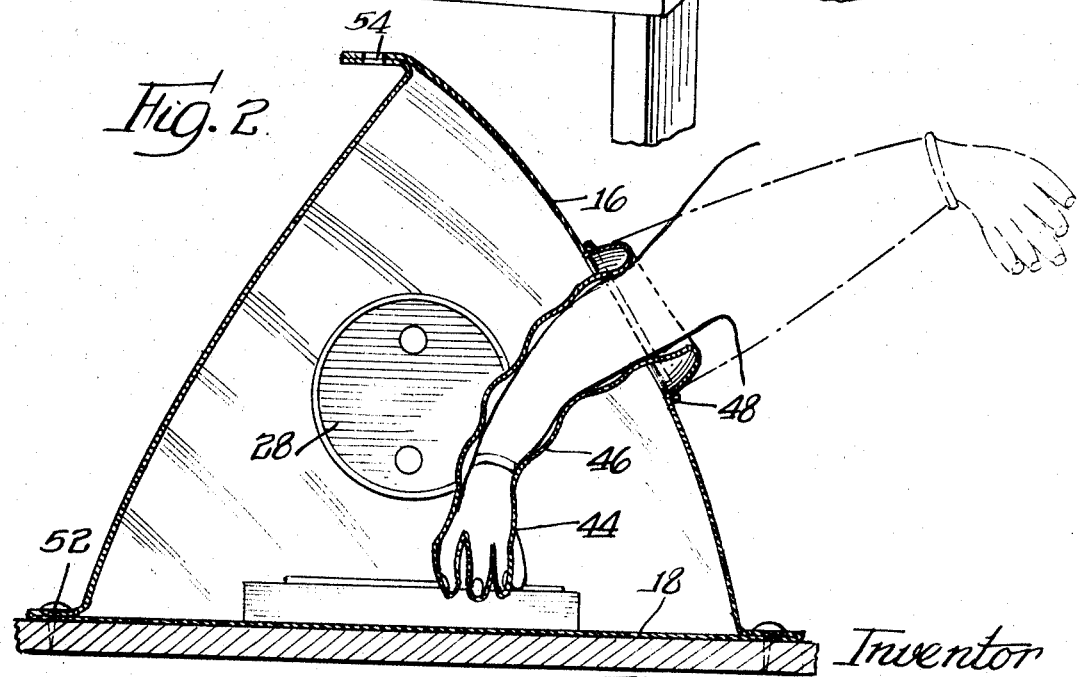
Inventor
Philip C. Trexler
By: Olson, Trexler, Wolters & Bushnell
attys.

Dec. 10, 1968  P. C. TREXLER  3,415,582
TETRAHEDRON ISOLATOR AND METHODS OF MAKING THE SAME
Filed Dec. 20, 1965  2 Sheets-Sheet 2
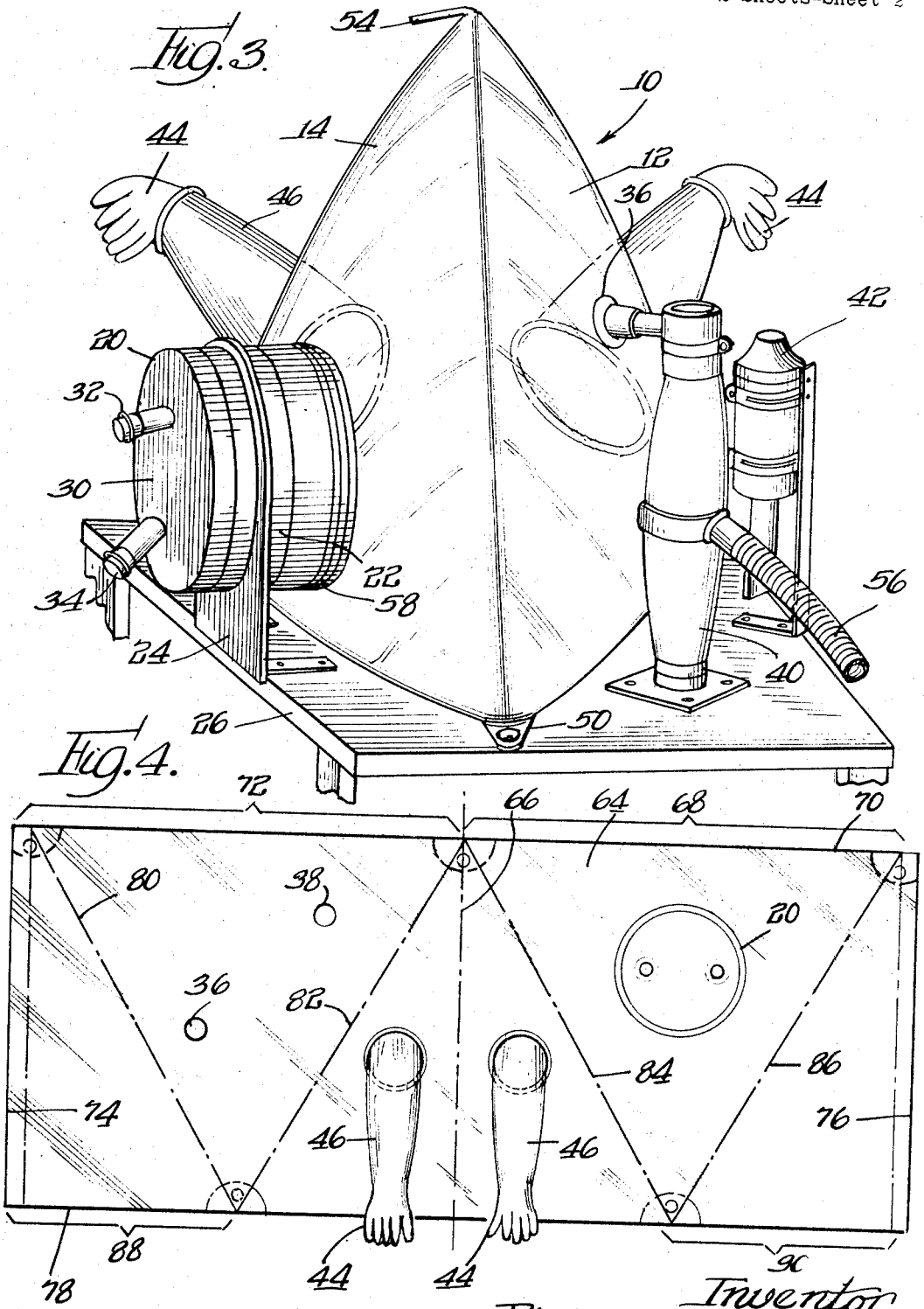
Inventor
Philip C. Trexler
By: Olson, Trexler, Wolters & Bushnell United States Patent Office 3,415,582
Patented Dec. 10, 1968

3,415,582
TETRAHEDRON ISOLATOR AND METHODS OF MAKING THE SAME
Philip C. Trexler, Hatfield, Herts, England, assignor to Snyder Manufacturing Company, Inc., New Philadelphia, Ohio, a corporation of Ohio
Filed Dec. 20, 1965, Ser. No. 514,960
7 Claims. (Cl. 312—1)

ABSTRACT OF THE DISCLOSURE

An isolator structure and the method of forming such a structure. The isolator comprises a totally enclosed housing of a flexible, impervious material, hermetically sealed from the surrounding atmosphere, and formed in the shape of a tetrahedron. The isolator includes a fluid inlet and outlet connected thereto to control the atmosphere within the housing and an entrance which permits the bringing of objects into and out of the housing without subjecting the atmosphere within the housing to the surrounding atmosphere. One embodiment of the isolator structure includes a pair of gloves connected to the wall of a housing for manipulating objects within the housing.

This invention relates to an isolator structure, and more particularly to an isolator having the general configuration of a tetrahedron and methods of making the same.

Isolators are used for biological tests, the assembly of delicate electronic components, and for other purposes requiring a controlled environment surrounding an object or a biological specimen. Isolators of a generally rectangular or oval configuration, shown in my prior Patents Nos. 3,051,163 and 3,051,164, are commonly utilized.

These isolators, while being very efficient, require several sealing operations in their manufacture. Each sealing operation, in the manufacture of an isolator, increases the cost of the isolator. Thus, prior art isolators are relatively expensive to make due to the relatively large number of sealing operations required in their manufacture. This expense is increased by the cost of a support frame generally used with the isolator.

After an isolator has been used, the structure is collapsed in order to change the composition of air or other gas within the isolator. Prior art isolators are, due to their generally rectangular shape, relatively difficult to collapse. The complete removal of the gas, often necessitates the disconnection of the isolator structure from a supporting frame and the folding of the structure.

When an isolator is to be sterilized, the folds of the isolator body must be interleaved with paper to protect the isolator process during the sterilization process. When the isolator is rectangular, or of an irregular shape, the insertion of the paper for sterilization is relatively difficult. Thus, the sterilization of prior art isolators is a difficult and time consuming operation.

Therefore, one of the objects of this invention is to provide an isolator structure which is relatively inexpensive to manufacture.

Another object of this invention is to provide an isolator structure which does not require a supporting frame.

Another object of this invention is to provide an isolator structure which can be easily collapsed to exhaust all the gas within the isolator.

Another object of this invention is to provide an isolator structure which can be easily prepared for sterilization.

Still another object of this invention is to provide an isolator which is compact and easily set up for use.

A further object of the present invention is to provide novel methods for making an isolator structure of the type described.

For a fuller understanding of the nature and objects of the invention, reference should be had to the following description, taken in connection with the accompanying drawings, wherein:

FIG. 1 is a side perspective view of the isolator as erected for use;
FIG. 2 is a sectional view of the isolator of FIG. 1;
FIG. 3 is a rear perspective view of the isolator; and
FIG. 4 is a plan view of the surface structure of the isolator before assembly.

Referring now to the drawings in greater detail, it will be seen that the isolator 10 has four surface planes 12, 14, 16 and 18, of a transparent plastic material, which are connected in the general shape of a tetrahedron. The surface plane 14, as shown in FIG. 3, has an entrance means 20 connected thereto. The entrance means 20 is of a known, commercially available, structure having an entry port 22.

The entry port 22 is supported by the positioning bracket 24 from the base member 26. The entry port has an inside entry cap 28 (see FIG. 2) and an outside cap 30. The outside cap 30 has two nipples 32 and 34 of vinyl tubing which serve to provide a means for evacuating the chamber between the two entry port caps 28 and 30. The entry port itself is of a known structure and does not, per se, constitute a part of the present invention.

Connected to the surface 12 of the tetrahedron isolator is an air, or other fluid, inlet 36 and an air, or other fluid, outlet 38. The inlet and outlet are sealed to the surface 12 and are of a generally known construction. The inlet 36 has an air, or other fluid, supply hose 56 and a filter 40 associated therewith. The hose 56 and filter 40 supply sterile air, or other fluid, under pressure to the interior of the isolator 10 through the inlet 36.

The outlet 38 has an outlet trap 42 through which the air, or other fluid, from the interior of the tetrahedron is removed. The outlet trap 42 has an outlet valve which prevents the air which surrounds the tetrahedron isolator from entering through the outlet 38 into the interior of the isolator. Thus, relatively high pressure air, or other gas, is supplied to the tetrahedron isolator through the inlet filter 40 and is exhausted through the outlet 38 and trap 42. Both the inlet filter 40 and outlet trap 42 are of a known construction.

The surface 16 of the tetrahedron isolator has gloves 44, of a transparent plastic, connected thereto by means of cylindrical sleeves 46. The plastic sleeves 46 are connected to the surface 16 by an airtight seal 48. The gloves 44 permit an operator, on the outside of the tetrahedron, to insert his hand into the interior of the tetrahedron, as shown in FIG. 2, and to manipulate an object or biological specimen in the isolator. The transparent plastic body of the isolator permits the operator to view the object while it is being handled. The operator can also manipulate the entrance 20 to pass biological specimens, or other objects, from the chamber between the inside and outside entry port caps to the inside of the isolator.

The tetrahedron isolator is retained in position on the base member 26 by eyelets 50. The eyelets 50 are connected to the base member 26 by screws 52, or other connection means. It will be readily apparent that the isolator can easily be disconnected from the base 26 by removing the screws 52.

The fluid pressure within the tetrahedron isolator supports the isolator vertically, in the position shown in FIGS.

1 and 3, due to the pressure differential between the interior and exterior of the isolator. Due to the relatively stable shape of a tetrahedron, a support frame for the isolator is not required. This enables the isolator to be placed on any desired base member, similar to the base member 26, and supported vertically thereon by merely applying air pressure through the air filter mechanism 40. It is apparent that the isolator could, if desired, be supported from a frame by the uppermost eyelet 54.

When the tetrahedron isolator is being disassembled, the entry port 22 may be disconnected from the isolator by opening the joint 58. The inlet filter 40 and outlet trap 42 can be disconnected from the inlet and outlet openings 36 and 38, in the surface 12 of the isolator by withdrawing the tubular members 60 and 62 from the outlet openings 36 and 38. The disassembly of the isolator is completed by disconnecting the eyelets 50 from the base 26. Thus, the isolator 10 may be disassembled for storage or sterilization with a minimum of effort.

The tetrahedron isolator shown in FIGS. 1 and 3 is made from a sheet 64 of a suitable transparent plastic material having four edges 70, 74, 76 and 78 (see FIG. 4). The entrance 20, gloves 44, and the air inlet and outlet 36 and 38 are attached to the surface of the sheet. Since access may be had to either side of the sheet, they may be readily attached. Once this has been done, the sheet is folded longitudinally about its central axis 66. A right right end portion 68, of upper edge 70, will then be adjacent a left end portion 72, of the edge 70.

The two edges 74 and 76 are then sealed together to form a tube. Next, edges 68 and 72 are sealed together. Open edge 78 is then positioned with the joint, between the two edges 74 and 76, adjacent the intersection of axis 66 and the edge 78. The edge 78 is then sealed in this position at a right angle to the sealed edge 70. Thus, a tetrahedron is formed having folds along the dash lines 80, 82, 84 and 86 of FIG. 4.

It will be apparent from the foregoing description of the method of forming the tetrahedron isolator 10 that only three basic sealing operations are required. First the edge portions 74 and 76 are sealed together. Then the edges 68 and 72 are sealed together. The third and last sealing operation consists of sealing the two portions 88 and 90 to the center portion of the edge 78.

When the production of a relatively large number of tetrahedron isolators is contemplated, the first sealing operation, i.e., the sealing of edge portions 74 and 76, can be eliminated by obtaining the plastic in the form of a flat tube or cylinder. With a plastic tube or cylinder only two sealing operations are required to make a tetrahedron isolator. The first sealing operation would be the sealing of the edges, corresponding to edges 68 and 72, of one end of the plastic tube. The other edge portion of the tube, corresponding to edge 78, would then be positioned and sealed at a right angle to the previous seal.

It will also be apparent that the tetrahedron could be constructed of two separate surfaces by merely having two separate sheets joined at the axis 66. Also, the tetrahedron isolator 10 could be formed by sealing four separate triangular-shaped members together along the lines 80, 82, 84 and 86. However, the construction method previously set forth is preferred, since it requires the fewest sealing operations.

Once the general shape of the tetrahedron has been formed, by the previously described sealing operations, the eyelets 50 and 54 are formed at the four peaks of the tetrahedron. As previously explained, the eyelet 54 may be utilized to support the tetrahedron from a support frame. It is contemplated that the sealed edges 74 and 76 will be placed on the bottom surface 18 of the tetrahedron isolator. Such a construction eliminates the unsightly seal and keeps the clear plastic surfaces of the sheet 64 relatively unobstructed for viewing the interior of the tetrahedron isolator 10. However, it will be apparent to those skilled in the art that the seal, between the two edges corresponding to edges 74 and 76, could be placed on any desired surface, such as surfaces 12, 14 and 16.

The tetrahedron isolator 10 may be collapsed by disconnecting the high pressure air source and inlet filter 40 from the isolator and allowing the gases which are within the interior of the isolator to be exhausted out the entrance port 20. This removal of the air from within the interior of the tetrahedron can, due to the shape of the isolator, be easily and quickly done. Once the tetrahedron has been completely collapsed, a change of the air may be easily made by known methods. Since it is not necessary to utilize a frame to support the tetrahedron isolator 10, the collapsing and subsequent exhaustion of gas from the interior of the isolator may be done without removing the isolator from the base member 26.

If it is desired to sterilize the tetrahedron isolator, the isolator would be collapsed and protective paper interleaved between the folds of the plastic surfaces of the isolator. This insertion of protective paper will be easily accomplished as the isolator is collapsed.

From the foregoing description, it will be apparent that the tetrahedron shape of the isolator 10 results in an isolator which can be manufactured with a minimum of construction steps and cost. An isolator which has the tetrahedron shape shown in FIGS. 1 and 3 is also generally stable and self supporting on its base when the relatively high pressure gas is supplied to the interior of the tetrahedron. The shape and compact size of the isolator permits it to be readily set up at any desired location and quickly collapsed for movement to another location.

The specific example herein shown and described is illustrative only. Various changes in structure will, no doubt, occur to those skilled in the art, and these changes are to be understood as forming a part of this invention, insofar as they fall within the spirit and scope of the appended claims.

What is claimed is:

1. The method of constructing a tetrahedron isolator comprising the steps of providing a flexible, impervious surface means having four edges, connecting entrance means, a fluid inlet and a fluid outlet at predetermined locations on said surface means, joining and sealing a first portion of a first edge of said surface means to a second portion of said first edge, joining and sealing second and third edges of said surface means to each other, and joining and sealing first and second end portions of a fourth edge to a middle portion of said fourth edge to form said isolator.

2. The method set forth in claim 1 further including the step of connecting glove means to said surface means.

3. The method of constructing an isolator in the shape of a tetrahedron, comprising the steps of providing a flexible, impervious, tubulated surface means, forming an entrance means, a fluid inlet and a fluid outlet at predetermined locations on said tubulated surface means, sealing a first edge portion of said tubulated surface means thereby to close one end thereof, positioning a second edge portion of said tubulated surface means at a substantially right angle to said first edge portion, and sealing said second edge portion, thereby to close said other end of said tubulated surface means and to form said isolator.

4. The method set forth in claim 3 further including the step of connecting glove means to said tubulated surface means.

5. An isolator including four surface means of a flexible, impervious material joined and hermetically sealed together to form a totally enclosed, fluid-tight housing in the general configuration of a tetrahedron, one of said surface means serving as a base and the remaining three surface means comprising the walls of said housing, a fluid inlet and outlet hermetically connected to one of said surface means comprising said walls, for channeling a predetermined atmospheric fluid into and out of, respectively, said housing, so as to control the atmosphere within said housing, and an entrance means connected to one of said walls, said entrance means permitting the bringing of objects into and out of said housing without subjecting the atmosphere within said housing to the atmosphere surrounding said housing.

6. An isolator as claimed in claim 5 wherein each of said four surface means has the shape of an equilateral triangle, thereby to form an equilateral triangular tetrahedron, and wherein said fluid inlet and outlet are connected to a first wall of said tetrahedron and said entrance means is connected to a second wall of said tetrahedron.

7. An isolator as claimed in claim 6 and further including a pair of gloves hermetically sealed to a third wall of said tetrahedron, said gloves permitting the manipulation of objects located within said isolator.

References Cited

UNITED STATES PATENTS

| 2,656,844 | 10/1953 | Kreuzer | 52—2 |
| 2,786,740 | 3/1957 | Taylor et al. | 128—1 X |
| 2,962,843 | 12/1960 | Hoelzer et al. | 53—180 X |

RICHARD A. GAUDET, *Primary Examiner.*

W. E. KAMM, *Assistant Examiner.*

U.S. Cl. X.R.

128—1; 23—259; 52—2